ELECTRONIC COMPUTER INPUT EQUIPMENT

Filed April 7, 1966

3 Sheets-Sheet 1

Inventor:
CHARLES REMY COOREMAN
By Kemon, Palmer,
Stewart & Estabrook
Attorneys

Inventor:
CHARLES REMY COOREMAN
By Kenon Palmer,
Stewart & Estabrook
Attorneys

Jan. 5, 1971 C. R. COOREMAN 3,553,680

ELECTRONIC COMPUTER INPUT EQUIPMENT

Filed April 7, 1966 3 Sheets-Sheet 3

KEYBOARD

Inventor:
CHARLES REMY COOREMAN
By Kemon Palmer, Stewart & Estabrook
Attorneys

United States Patent Office 3,553,680

Patented Jan. 5, 1971

3,553,680

ELECTRONIC COMPUTER INPUT EQUIPMENT

Charles Remy Cooreman, Colombes, France, assignor, by mesne assignments, to Compagnie Internationale pour l'Informatique, Louveciennes, France, a corporation of France Filed Apr. 7, 1966, Ser. No. 540,996
Claims priority, application France, Apr. 26, 1965, 14,638; Mar. 30, 1966, 55,660
Int. Cl. G08c *9/06;* H03k *13/20*
U.S. Cl. 340—347 17 Claims

ABSTRACT OF THE DISCLOSURE

Electronic computer input equipment of the type employing the principles of man to machine communication systems wherein a man operates an opaque pointer in a light field extending across a visualization table and apparatus is provided for determining the coordinate position of the pointer within the field such that electrical signals of such position are provided as inputs to the computer. Specifically a plurality of light beams corresponding in number to the coordinate axes are directed across the table to a like number of photoelectric receivers. Apparatus is provided to produce or simulate cyclic scanning of the area covered by the light beams, and additional means are provided to derive from the output of the receivers electrical signals encoding the coordinate values of any position man gives to the opaque pointer within the field.

The present invention concerns improvements in or relating to input equipment for electronic computers of the kind wherein information data are introduced into the computer responsive to the positions and moves of a pointer on a table on which or on display means associated therewith there is provided a display of information data supplied from the computer, including those responsive to the introduction of data into said computer from such positions and moves, and processing of same within said computer.

According to the invention, an input equipment of the above defined kind comprises the combination of as many light sources of light beams parallel to and in close proximity to the surface of said table as are coordinate axes in the display, as many photoelectric receivers as are light sources, optical means guiding said beams from said sources to said receivers across the surface of said table, means associated with said sources and (or) said receivers for producing or simulating a cyclical sweep of the beams across the surface of said table according to said coordinate axes, and means for deriving from the outputs of said photoelectric receivers varying in accordance with the positions and moves of an opaque pointer on said table electric digital signals applied to information inputs of an electronic computer.

The invention will be fully described with reference to the accompanying drawings, wherein.

Figure 1:
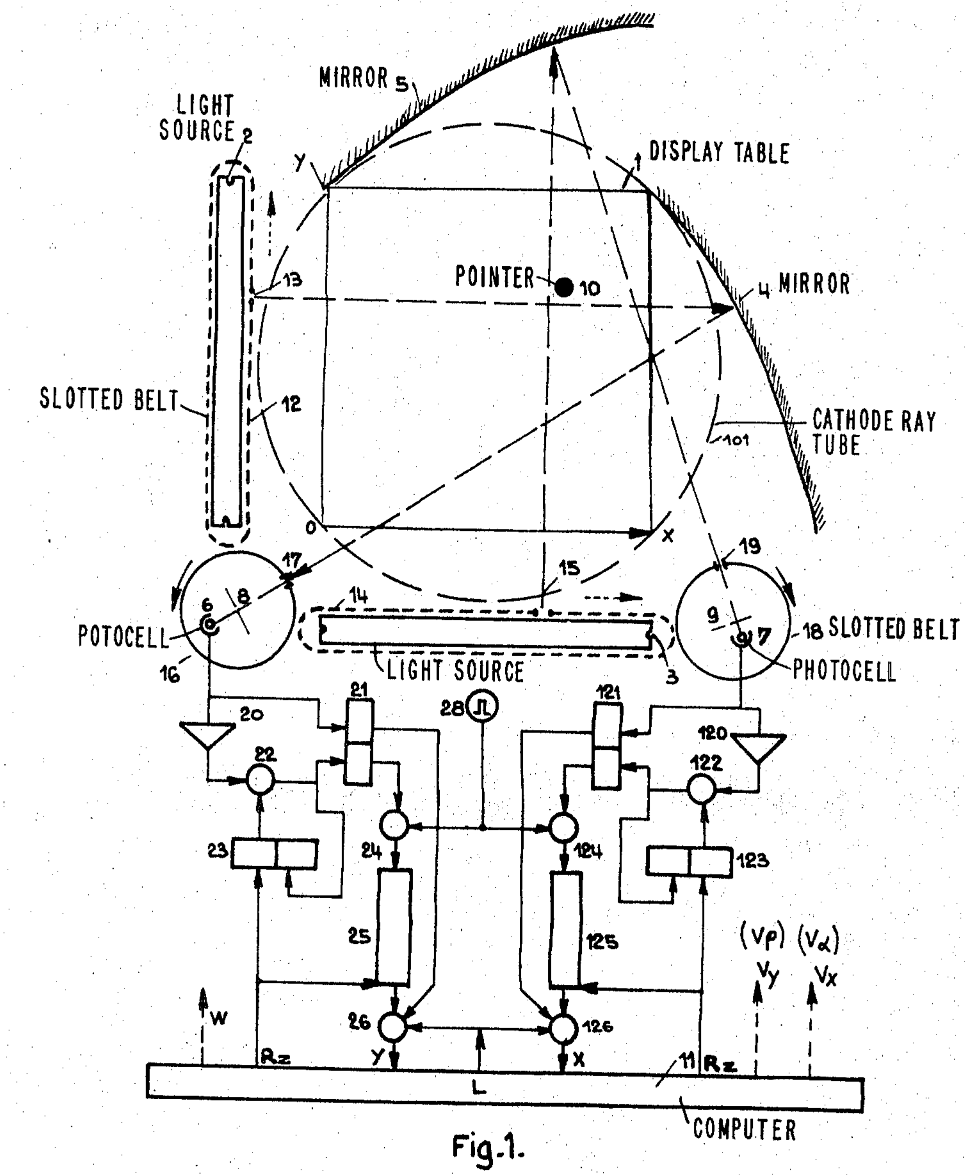
FIG. 1 shows a first illustrative embodiment of an input equipment according to the invention.

In FIG. 1, a display table 1 is shown as a translucent plate arranged over the screen of a cathode ray tube 101, the display of which is controlled from the computer 11. Of course it be not imperative that the same table is used for both the display and the information data input equipment proper. The coordinates are the cartesian ones, X and Y, with perpendicular axes. The modification for adapting the embodiment to three coordinate axes of relatively 60° slants will appear obvious to one skilled in the art.

On two edges of the table 1 are arranged rectilinear light sources 2 and 3, each having a luminescence useful length at least equal to the length of the adjacent edge of the table 1. They can emit visible or invisible light and preferebly, by filtering for instance, said light may be made monochromatic. Said sources are for instance made of fluorescent tubes housed within cylindrical reflecting sheaths presenting slits along paths parallel to the edges of the table 1 and in a plane or planes slightly above the level of said table. These sources emit two sheets of light each of which spans over the complete surface of the table 1.

On the edges of the table opposite to the sources, are provided spherical or parabolic mirror segments 4 and 5 respectively reflecting the light of said sheets at their foci whereat are arranged photocells 6 and 7, preferably photomultipliers, behind fixed optical diaphragms 8 and 9. The light reflections are, in the illustrated embodiment, in a single plane but of course this is not at all imperative and, for instance, the mirrors may be somewhat inclined with respect to the plane of the table which may facilitate the positioning of the receivers with respect to the light sources (from a mechanical point of view) and/or enable the location of the receivers above the light sources and consequently and correspondingly reduce the overall lateral dimensions of the arrangement.

In order to detect the position of an opaque pointer the location of which is for instance shown at 10, which pointer may be manually operated, directly or through a telecontrol arrangement, and in order to afterwards supply the coordinates of such pointer to the computer (no detail of which is shown as being actually outside the scope of the invention), it is necessary to ensure some kind of sweep of the surface by the light. Such a sweep or scan may be actual or it may be simulated. An actual scanning could be made, as indicated in dot lines from opaque endless belts 12 and 14, provided with slots 13 and 15, which would be driven at a uniform and constant speed. Two perpendicular light pencils would then scan the surface of the table. A drawback of such an arrangement would be that the mirrors would reflect the useful light and the stray light, hence a risk of an insufficient signal-to-noise ratio. A simulated scanning may be provided as shown by surrounding the receivers 6 and 7 with opaque drums 16 and 18 provided with slots such as 17 and 19 and driven at a constant speed from an unshown motor. Substantially all stray light is thus eliminated and so it is for any arrangement in which a simulated scanning is provided by displacement of a slit at the receiver's side. For instance, in FIG. 3, the endless belts 12 and 14 are driven near the edges of the table opposite to the edges at which are located the light sources. The light pencils from the slots 13 and 15 are reflected on the receivers 6 and 7 by mirrors 34 and 35 the receivers being located substantially at the foci of the mirrors.

Figure 3:
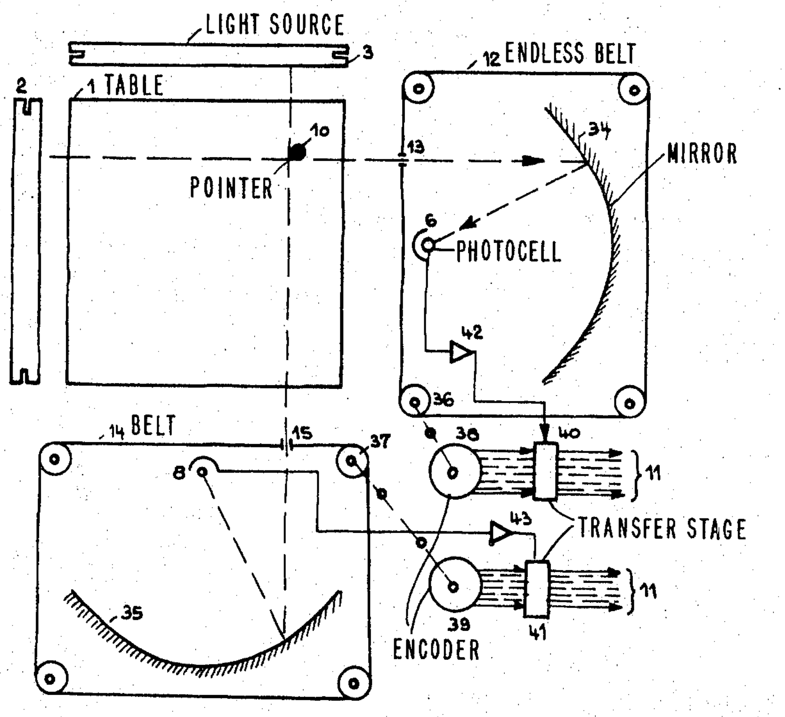
FIG. 3 shows a second illustrative embodiment of an input equipment according to the invention.

In FIG. 3, a way of deriving signals from the receivers to the computer has recourse to encoders such as 38 and 39 driven in synchronism with the belts 12 and 14, for instance from mechanical coupling with the driving axles of such rollers as 36 and 37 in the belt drives. Such encoders, either of the magnetic kind or of any other kind, permanently deliver signals on parallel digital outputs, the digital codes of which consequently permanently follow the instantaneous or substantially instantaneous values of the coordinates defined by the sweeping of the slots 13 and 15 of the belts but these signals are not permanently applied to the computer 11, as transfer stages are inserted between said encoders 38 and 39 and the inputs of said computer and said transfer stages 40 and 41 are gated by the outputs from the photocells 6 and 8, amplified at 42 and 43, so that they are only unblocked when the photocells 6 and 7 present interruptions of lighting condition due to the presence of an opaque member such as 10. Obviously, as the belts move and their slots pass behind the mirrors, no codes are generated which merely means that the encoder tracks are provided only on part of the cylinders of said encoders. Usually, digital code registers (not shown) are interposed between the outputs of the transfer stages 40 and 41 and the actual inputs of the computer 11, mainly for converting parallel into series digital codes.

Such a way of deriving electrical digital codes from the photocell outputs may be used in relation to the optical arrangement of FIG. 1. In said FIG. 1 however, another arrangement is shown for obtaining the codes of the coordinates of an opaque member 10. The output of the receiver 6 is routed to an inverter amplifier 20 the output of which controls an input of a bistable stage 21 through an AND gate 22, and the said output is further directly connected to the other input of the bistable stage 21. And said stage 21 controls an AND gate 24 which receives on its information input a sequence of recurrent pulses from a pulse generator 28 and the output of 24 is connected to an input of a pulse counter 25. The condition of the gate 22 is controlled from a bistable member 23 one activation input of which comes from the output of 22 and the other activation input of which comes from a reset to zero output Rz from the computer 11. The counter may be read-out from an output passing through a routing gate 26 placed under the control of an output of the bistable member 21 and one output L from the computer 11. The output of 26 is connected to an input Y of the computer so that the ordinate Y codes will be introduced into said computer when all conditions are met. An identical arrangement is associated to the other photoelectric receiver 7, the circuits and members of said other arrangement being denoted by similar reference numerals with the addition of a hundred to said references. The output from said second arrangement is connected to the information input X of the computer, which will consequently receive the codes of the abscissae of the position of the opaque member 10.

Figure 2:
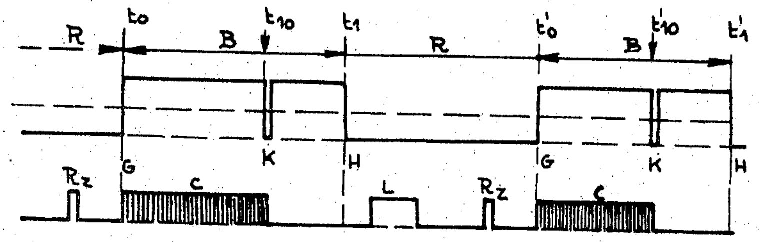
FIG. 2 shows graphs of electrical signals concerning the operation of the equipment of FIG. 1.

Prior to the beginning of a scanning operation, the computer has issued Rz a reset signal for the counters 25 and 125 and of the bistable stages 23 and 123. When at reset condition, the stages 23 and 123 unblock the gates 22 and 122. The stages 21 and 121 from the preceding cycle of scanning of the table remain in such conditions that the gates 24 and 124 are blocked and the transfer stages or gates 26 and 126, unblocked. When the slot 17 of the rotating drum 16 is in the position that a light ray falls on the photocell 6 from the direction of the base line OX of the display table and that simultaneously, the slot 19 of the drum 18 is in the position where a light ray falls on the photocell 7 in the direction parallel to the base line OY of the table, at the time instant marked $t_0$ in the graphs of FIG. 2, the receivers are suddenly lighted and will remain illuminated during the whole cycle of scanning except during a time instant when the opaque member 10 will be positioned across the light ray passing through the slots. The receivers will remain lighted during a time interval $t_0$ to $t_1$ in each scanning except when the slot faces the opaque at which time, there occurs a negative pulse $t_{10}$ (of course not at the same time instant for each receiver). The second line of the graphs of FIG. 2 shows an output from one of the receivers, which becomes high at G and remains high until H with except for a transient fall at K, at the instants respectively corresponding to $t_0$, $t_1$ and $t_{10}$.

The sudden change of illumination at the instant $t_0$ produces a rising edge in the signal issuing from the receiver which, having its polarity inverted at 20 and passing through the gate 22 activates the bistable circuit 21 to thereby unblock the gate 24 and admit pulses from 28 into the counter 25. As soon as this rising edge is passed, the bistable stage 23 is actuated from the output of 22, which blocks said stage 22. The sudden fall in voltage at K, time instant $t_{10}$, resets the bistable member 21 which blocks the gate 24 and consequently stops the counting of pulses by 25. The number of the counted pulses then defines the corresponding coordinate value. The same process occurs for the other arrangement from the other receiver to the other counter and consequently the other coordinate is stored in counter 125. Until $t_1$ nothing more occurs. During the return period R of the scanning cycle, the computer issues a read-out signal L which controls the routing gates 26 and 126, which are presently unblocked from the conditions of the bistable members 21 and 121, so that the counters are read-out and the numerical codes of the coordinate values introduced within the computer. Each routing gate 26 or 126 may comprise, for instance, as many AND gates as are counting binary stages in the counters, each circuit receiving the unblocking signal, the read-out control signal and a voltage which is either high or low according to whether the stage of the counter to which it is connected is in the binary 0 or the binary 1 condition. The connection to the computer may be multifilar or parallel to serial conversion may be ensured by the interposition of conversion registers in the connections to the computer inputs.

Consequently, during the period R, after the read-out of the counters, the computer issues a reset pulse Rz, as previously stated. Of course, numerous modifications may be made to the above described arrangement, for instance the read-out signal from the computer can reset the counters to zero (the read-out from a reset of a counter is well-known per se). The periods during which pulses are counted could be made the reverse of what has been described, as the pulses could be only introduced within the counters from the time instants such as $t_{10}$ to the time instant $t_1$ instead of the time intervals from $t_0$ to $t_{10}$ (it would be a matter of reversal of the controls of the gates 24 and 124).

The system is provided with the usual display screen such as 101 and in dot lines are shown the outputs from the computer towards the deflecting members of the cathode ray tube, vertical deflections $V_Y$ and horizontal deflection $V_X$ or radial deflection $V_p$ and angular deflections $V_{ox}$ as the case may be, and a further light control signal W for the control light electrode of the cathode ray tube.

Figure 4:
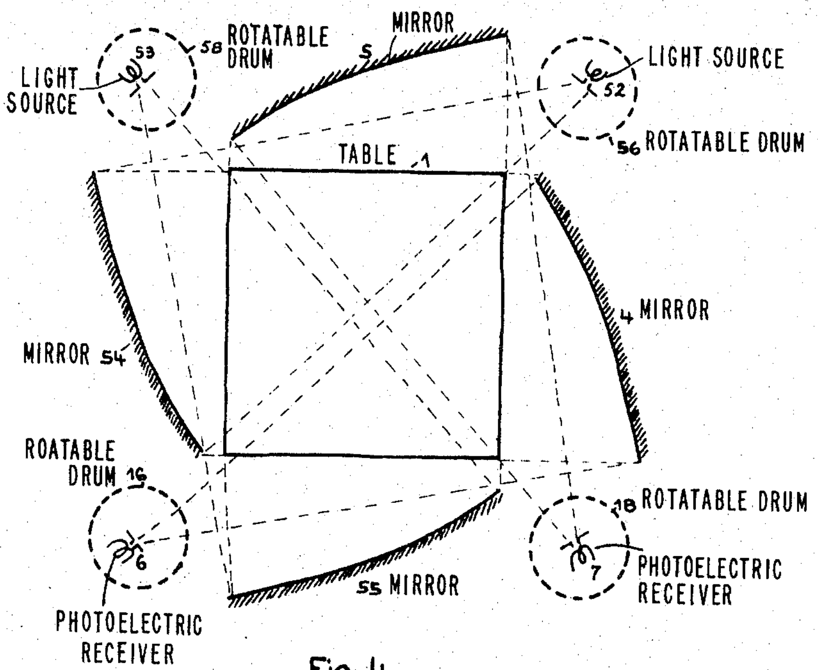
FIG. 4 shows an optical arrangement for explaining further possibilities of reducing the invention into practice.

Many alternatives may further be used for the optical arrangement of the device. In order to define such alternatives, reference is made to FIG. 4 which illustratively shows a table 1, two sets of mirrors 5–55 and 4–54 on each sides of the table 1 according to two perpendicular coordinate axes, two light sources 52 and 53 and two photoelectric receivers 6 and 7, the sources directing light pencils on the mirrors 54 and 55 respectively which, in turn, respectively reflect said light pencils on the receivers 6 and 7. The purpose of the mirrors mainly lies in the requested mechanical compactness usually required for the device.

At 56 and 58 for the sources 52 and 53, and at 16 and 18 for the receivers 6 and 7, drums are shown in dot lines, the actual provision and purpose of which may be varied as follows:

(a) 56 and 58 are mirrors, slitted for the passage of the light from the sources 52 and 53 in two beams respectively spanning at an angular width corresponding to the mirror segments 54 and 55; the members 16 and 18 in this case are drums which rotate as described with respect to FIG. 1;

(b) 56 and 58 are slitted drums rotating around the sources so that narrow light rays scan the mirrors 54 and 55; the members 16 and 18 may still be rotating slitted drums synchronously rotating with the drums 56 and 58, or the members 16 and 18 may be slotted mirrors such that any reflected light pencil falls on the receivers; another modification consists in the mere omission of the members 16 and 18 when the light is monochromatic and of high brightness and the receivers provided are mainly responsive to the monochromatic light;

(c) The light sources 52 and 53 being bright and coherent, such as of laser sources for instance, the members 56 and 58 are only carriers for bringing said sources into an oscillation (to and fro) movement for scanning the table 1, and the members 16 and 18 are either omitted or are carriers synchronously oscillating the receivers 6 and 7.

Alternatively too, the source 52 and mirror 54, and the source 53 and the mirror 55, could be made as banks of coherent sources in parallel arranged with respect to corresponding edges of the table and an electrical switching of such sources in said banks could be ensured for each scanning cycle. The drums rotating around the receivers may then be omitted. Mutatis mutandis, the receivers 6 and 7 and the mirrors 4 and 5, could be made as banks of photoelectric receivers with sequential and cyclical activation of said receivers in each of said banks.

Figure 5:
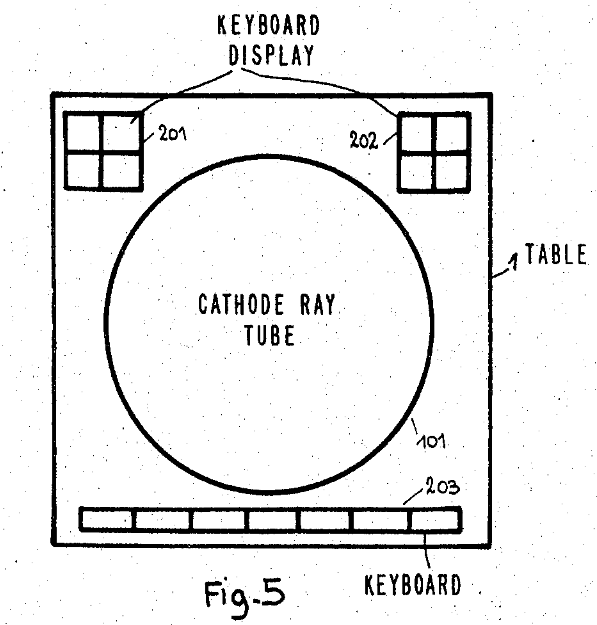
FIG. 5 shows a modification of the arrangement of the display table of the equipment; and, FIG. 6 shows a partial modification of the electric circuits of FIG. 1.

In the embodiment of FIG. 5, the table 1 is of larger area than the cathode ray screen, and in those parts of the display table unoccupied by said screen, these are provided permanent displays of "keyboards" i.e., displays of simple assemblies of squares or other geometrical shapes each of which corresponds to a particular control or instruction for the computer or for peripherical equipment which may be associated with said computer. When an operator applies an opaque pointer on one of said squares, the above described arrangement will elaborate the coordinate values of the pointer within the counters 25 and 125 (or the registers mentioned in relation to FIG. 3). Such coordinate values will be interpreted within the computer 11 as corresponding to the pointed square and consequently to the control or instruction implied by the position of the pointer on said square.

Figure 6:
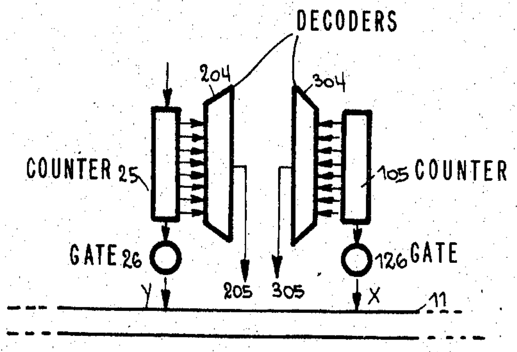

Such digital codes will be introduced in the counters or registers 25 and 125, as shown in the partial view of FIG. 6. Further to what is shown in FIG. 1, there are shown in said FIG. 6 decoder arrangements 204 and 304 the outputs of which 205 and 305 are not connected to inputs of the computer. These outputs will be directed as previously described to inputs of equipments associated to the computer but not making forming part thereof, for selective activation of such peripherical equipment inputs. The organization of said equipment will select the outputs from the decoders by analysing the values thereof simultaneously for the X and the Y coordinates. A first selection may be provided from the decoders themselves as they may be arranged not to decode all the codes or counts internal to the counters 25 and 125. For instance, the decoder 305 will decode all counts within 125 as, in FIG. 5, there is illustratively shown a "keyboard" 203 spanning substantially along the whole length of the scale of the abscissae and, on the other hand, the decoder 204 will only decode the lower and higher weight stages of the counter 25 since, in the said embodiment of FIG. 5, in addition to the "keyboard" 203 occupying the lower part of the ordinate scales, there are provided two "keyboards" 201 and 202 occupying the upper part of the ordinate scales. If required, the output from 305 could be gated by the output of 205 so that the X values will be transferred only when the counter 25 contains either a count corresponding to the lower ordinate values or a count corresponding to the higher ordinate values, hence values which may correspond to a pointing on a keyboard square.

Such keyboards could have been displayed on the cathode ray screen but in such a case, the computer should have to operate to maintain such displays, which would have been an unuseful load and work. Consequently the keyboard pictures are permanently provided on separate boards or plates, preferably removable to possibly vary their own arrangement according to programmes required for the computer and associated peripherical equipments.

Instead of providing decoders at 205 and 305, it is further contemplated to substitute transcoders, i.e. arrangements which, receiving a digital code at a plurality of inputs, delivers a different digital code at outputs of the same or different plurality. Such an arrangement may be provided for generating digital electric codes specifically adapted for particular controls of the external equipments to control from the "keyboards."

Further, one may understand that, specially when transcoders are provided instead of digital-to-analog decoders, the outputs of said transcoders, or part at least of them, may remain connected to inputs of the computer for instance for introducing within the computer's stores a code corresponding to that routed to such required external or peripherical equipment as identified by such an output code.

Decoders (digital to analog converters) as well as transcoders (digital to digital converters) are well known per themselves and do not necessitate any detailed description.

What is claimed is:

1. Electronic computer input equipment of the kind wherein information data are introduced into a computer responsive to positions and moves of an opaque pointer on a table on which or on display means associated therewith there is provided a display of information controlled from the computer, said equipment comprising: a source of paralleled light beams for each coordinate direction in said display, and each source disposed in close proximity to the surface of said table; a photoelectric receiver for each source of light beams, each receiver including at least one photocell responsive to the light beams from the associated source to produce signals indicative of the location of said pointer along said coordinate direction; optical guide means including a mirror for each source and associated photoelectric receiver, said means being positioned so as to reflectably direct and focus the light beams from the source across the surface of said table onto the photoelectric receiver; cyclic scanning means including a slotted and opaque member for each source of paralleled light beams, said scanning means being interposed between the associated source and receiver and driven such that the slot is progressively displaced in the coordinate direction such that the light beams for said receiver are progressively displaced in the coordinate direction; and means deriving from the outputs of the photoelectric receivers electrical digital signals encoding the coordinate values of the positions of said pointer for introduction of corresponding information data within said computer.

2. Combination according to claim 1, wherein each light source consists of a lumped light emitter and each of said slotted opaque scanning member consists of a slotted opaque drum revolving around said source.

3. Combination according to claim 1, wherein each light source consists of an elongated source spanning over the length of an edge of the table and each cyclical scanning member comprises a slotted belt driven in translation before that side of said source which is oriented toward said table.

4. Combination according to claim 1, wherein each opaque slotted member comprises a slotted belt in a loop suppounding a photocell and a focussing mirror associated thereto and driven in translation along one side of said table.

5. Combination according to claim 1, wherein each light source comprises a bank of small point source light emitters and said cyclical scanning means comprises means for sequentially and cyclically activating said emitters.

6. Combination according to claim 1, wherein each photoelectric receiver comprises a bank of small photocells and said cyclical scanning means comprises means for sequentially and cyclically activating said photocells.

7. Combination according to claim 1, wherein each of said light sources comprises a source emitter of a sharp monochromatic light beam, and said cyclical scanning means comprises means for sweeping said sharp light beams across the surface of said table.

8. Combination according to claim 1, wherein said electrical signals deriving means comprise the combination of an electrical encoder driven in synchronism with said movable slotted and opaque member, an output gating arrangement for said encoder and circuit means for controlling the said gating arrangement from the output of the corresponding photoelectric receiver, the output of said gating arrangement being connected to an information input of said computer.

9. Combination according to claim 1, wherein said electric digital signal deriving means comprise a pulse generator, as many pulse counters as are photoelectric receivers, gating arrangements between the output of said pulse generator and the inputs of said counters, means for controlling said gating arrangements from a predetermined time instant of operation of said cyclical scanning means to a time instant marking, for each of the said counters, a change of output in the corresponding photoelectric receiver, and means controlled from said computer for reading out in the intervals between said cyclical scannings the contents of said counters and resetting said counters to zero counts prior to the beginning of the next scanning operation.

10. Combination according to claim 1, wherein said display of information controlled from said computer comprises the screen of a cathode ray tube arranged beneath said table, said table being made of translucent material.

11. Combination according to claim 10, wherein said screen occupies only a part of the surface of said table and other parts of the surface of said table carry permanent display designs of the keyboard kind.

12. Combination according to claim 1, wherein said electric digital signals deriving means include digital temporary storing means, means controlled from said cyclical scanning means for introducing into said temporary storing means binary data defining the coordinate values of said opaque member, and means for cyclically erasing the contents of said temporary storing means, the outputs of which are routed to information inputs of said computer.

13. The combination according to claim 12 wherein said temporary storing means includes digital to analogue converters connected to the outputs of the said storing means for converting the contents of said temporary storing means into analogue signals on the output terminals of the converter.

14. The combination of claim 12 wherein said temporary storing means includes digital to digital converters connected to the outputs of the said storing means for converting the contents of said temporary storing means into digitally encoded signals on the output terminals of said converter.

15. Combination according to claim 1, wherein each slotted opaque scanning member consists of a slotted opaque drum revolving around one of said photocells.

16. Combination according to claim 15, wherein each light source consists of an elongated source spanning over the length of a complete edge of said table.

17. Combination according to claim 15, wherein each light source consists of a lumped light emitter and a mirror reflecting the light of said emitter as a beam spanning over the surface of said table.

References Cited

UNITED STATES PATENTS

| | | | |
|---|---|---|---|
| 3,128,340 | 4/1964 | Harmon | 178—18 |
| 1,901,673 | 3/1933 | Sleeper | 178—18 |
| 2,907,824 | 10/1969 | Peek, Jr. | 178—18 |
| 2,769,374 | 11/1956 | Sick | 250—221 |
| 2,963,697 | 12/1960 | Giel | 340—347 |
| 3,033,991 | 5/1962 | Sampson | 250—219 |
| 3,313,944 | 4/1967 | Muir | 250—222 |
| 3,360,654 | 12/1967 | Müller | 250—221 |

OTHER REFERENCES

Goertzel, G., "Visual Display Data Entry Device," IBM Tech. Disclosure, vol. 9, No. 7, December 1966.

MAYNARD R. WILBUR, Primary Examiner

G. R. EDWARDS, Assistant Examiner